Figure 1:
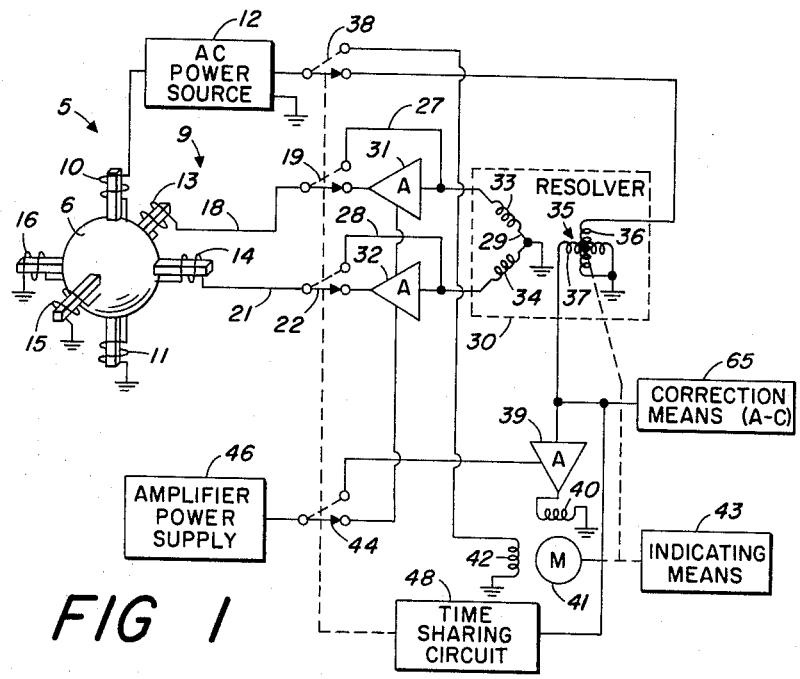

Oct. 5, 1965   B. B. BIDERMAN   3,209,602
DRIVE AND SENSING MEANS FOR BALL GYROSCOPE
Filed Aug. 2, 1961

INVENTOR.
BENJAMIN B. BIDERMAN
BY Moody and Harris
ATTORNEYS

United States Patent Office 3,209,602
Patented Oct. 5, 1965

3,209,602
DRIVE AND SENSING MEANS FOR BALL GYROSCOPE
Benjamin B. Biderman, Cedar Rapids, Iowa, assignor to Collins Radio Company, Cedar Rapids, Iowa, a corporation of Iowa
Filed Aug. 2, 1961, Ser. No. 128,745
7 Claims. (Cl. 74—5.6)

This invention relates to a gyroscope and more particularly to driving and sensing means for a gyroscope having a freely suspended spherical rotor.

A gyroscope having a freely suspended spherical rotor, which gyroscope is referred to hereinafter as a ball gyroscope, commonly has the rotor suspended within suitable frame means conventionally, such as, for example, on a cushion of air or by electrostatic means, and is commonly rotated by an applied force, which force may, for example, be a stream of air or a rotating magnetic field.

As is common when utilizing a gyroscope, the orientation of the spin axis must be determined in order to sense any deviation from the normal. In the ball gyroscope, however, sensing of the spin axis is more difficult than in the conventional gyroscope, and while sensing of the spin axis of a suspended ball has been effected heretofore, no effective system has been found for sensing the spin axis by electrical means.

It is therefore an object of this invention to provide means for electrically sensing the orientation of the spin axis of the rotor of a ball gyroscope.

More particularly, it is an object of this invention to provide sensing means including a plurality of coils surrounding the rotor of a ball gyroscope and a resolver the stator of which is connected with said coils in a manner such that the position of the rotor of said resolver is made to assume a position governed by the orientation of the spin axis of said ball.

When utilizing a ball gyroscope it is often desirable, if not mandatory, that the rotor be driven in such a manner that the rotating force applied is always normal to the spin axis to avoid causing precession of the spin axis. In other words, a problem arises in slaving the driving force to the orientation of the spin axis and this problem has not been adequately solved heretofore where the driving force utilized is a rotating magnetic field.

It is therefore another object of this invention to provide means to drive the rotor of a ball gyroscope so that the applied driving force does not precess the spin axis of said rotor.

More particularly, it is another object of this invention to provide electrical means for sensing the orientation of the spin axis of the rotor of a ball gyroscope and causing driving force to be applied to the rotor without causing precession of the spin axis.

Still more particularly, it is another object of this invention to provide driving and sensing means for a ball gyroscope including a plurality of coils spaced about the ball and a resolver the stator of which is connected with said coils in a manner such that the rotor of said resolver is caused to assume a position dependent upon the orientation of the spin axis of the ball so that the ball may be driven by power coupled at least in part through said resolver to thereby avoid precessing the spin axis of said ball.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiments of the herein disclosed invention may be included as come within the scope of the claims.

Figure 2:
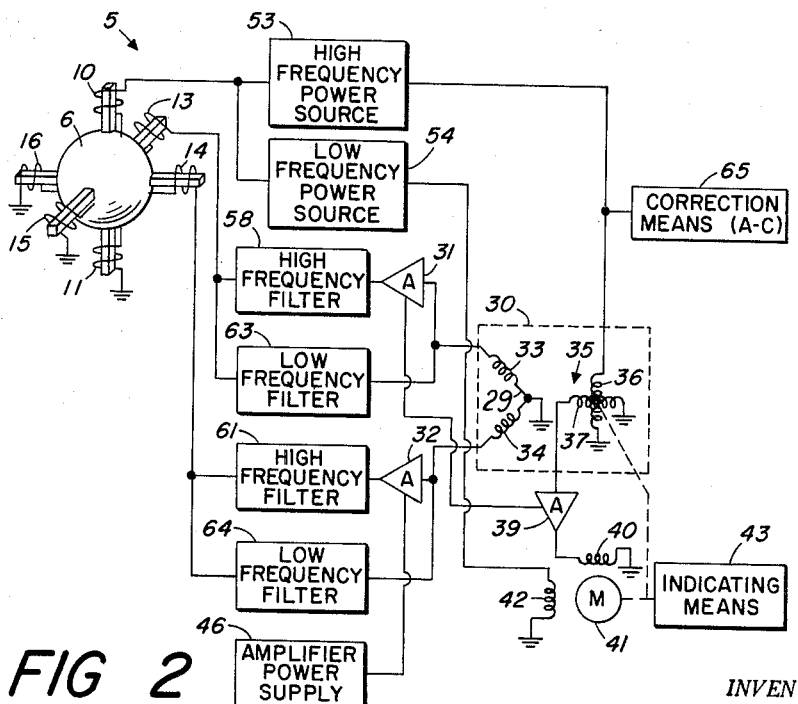

The accompanying drawings illustrate two complete examples of the embodiments of the invention constructed according to the best mode so far devised for the practical application of the principles thereof, and in which:

FIGURE 1 is a partial schematic presentation of the driving and sensing means of this invention wherein the ball is alternately driven and sensed; and FIGURE 2 is a partial schematic presentation of a second embodiment of the driving and sensing means of this invention wherein the ball is constantly sensed and driven.

Referring now to the drawings in which like numerals have been used for like characters throughout, the numeral 5 represents generally a ball gyroscope having a spherically shaped rotor, or ball, 6 freely suspended in suitable conventional frame means (not shown). The ball may be suspended in conventional fashion, for example, by means of a cushion of air or electrostatically. Ball 6 would be constructed of a magnetizable material such that rotation thereof would effect distortion of a magnetic field within which the ball is oriented.

The driving and sensing means of this invention, indicated generally by the numeral 9, includes a first pair of serially connected coils, or inductive means, 10 and 11, which coils are shown positioned at opposite sides of the ball and in alignment so that their extended axes pass coincidently through the center of the ball to establish a magnetic field therethrough when energized. As shown in FIGURE 1, inductors 10 and 11 may be vertically positioned and may be energized by A.-C. power source 12, which source may, for example, be of a frequency of 400 c.p.s as commonly available from an aircraft power supply.

In addition, four other coils 13, 14, 15 and 16 may be positioned about the ball with coils 13 and 14 having their axes in alignment with the axes of coils 15 and 16, respectively, and positioned so that each coil is normally disposed with respect to all adjacent coils including coils 10 and 11, as shown in the drawings, so that all are electrically in quadrature with one another. In addition, coils 13 and 15 are serially connected as are coils 14 and 16. Thus if an A.-C. signal is coupled to coils 10 and 11 and either of the serially connected pairs of remaining coils, a rotating magnetic field will be established that causes the ball to rotate about a spin axis that is in the plane of the axes of coils 13, 14, 15 and 16. If coils 13 through 16 are horizontally disposed, as shown in the drawing, then the spin axis will also be horizontal.

It is to be appreciated, however, that a vertical spin axis could be established by energizing the four horizontally disposed coils, or that any other spin axis could be established merely by connecting the coils in a different manner, as would be evident to one skilled in the art, and this invention is therefore not meant to be restricted to the specific embodiments illustrated by the drawings.

It is also to be appreciated that the coils might be spaced in a different manner, or coils added or deleted, as would also be evident to one skilled in the art, and that the combination of six coils positioned as shown in the drawings, although found to be preferable, is not the only possible combination or arrangement and the instant invention is not meant to be limited thereto.

As shown in FIGURE 1, coils 13 and 15 may be connected by means of lead 18 to the movable contactor of switch 19 and coils 14 and 16 may be connected by means of lead 21 to the movable contactor of switch 22. Switches 19 and 22 are preferably double throw switches each of which has one stationary contact connected by means of leads 27 and 28, respectively, to the stator 29 of a resolver 30 and the other stationary contact connected to receive the output from a pair of conventional matched linear amplifiers 31 and 32, respectively.

Resolver 30 may be conventional with stator 29 having an arm 33 connected to both lead 27 and amplifier 31, and an arm 34 electrically in quadrature relationship with arm 33 and connected to both lead 28 and amplifier 32. Rotor 35 of resolver 30 may have a pair of windings 36 and 37 positioned electrically in quadrature relationship with one another with winding 36 connected to A.-C. power source 12 through two position switch 38 while winding 37 may be connected through a conventional amplifier 39 to one winding 40 of a conventional two phase induction motor 41. The other winding 42 of motor 41 may be connected to power supply 12 through switch 38 so that power is applied either to the motor winding 42 or to rotor winding 36. Motor 41 may also be mechanically connected to rotor 35 and to a conventional indicating means 43 so that motor 41 controls the rotation of rotor 35 and the positioning of indicating means 43.

A two position switch 44 may also be provided to connect amplifiers 31, 32 and 39 to a conventional amplifier power supply 46. In one position of switch 44, power is supplied to amplifiers 31 and 32 for driving the ball, while in the other position amplifier 39 is provided with power to enable energization of motor winding 40.

Switches 19, 22, 38 and 44 are constrained to move in unison, as shown in FIGURE 1, and may, of course, be a single switch with multiple poles or, in lieu thereof, another type of switching could be used, such as solid state switching, for example. In addition, conventional time sharing circuit means 48 may be provided to control switching between the two positions in any desired manner.

In operation, when coils 10 and 11 are energized and when switches 19, 22, 38 and 44 are in a sensing position (as shown by dotted lines in FIGURE 1) so that stator arms 33 and 34 are connected to the coils 13 through 16, motor winding 42 is energized, and amplifier 39 is supplied with power, coils 13, 14, 15 and 16 have voltages induced therein of a magnitude dependent upon the orientation of the spin axis of ball 6.

The voltage induced in coils 13 and 15 is coupled to stator arm 33 while the voltage induced in coils 14 and 16 is coupled to stator arm 34, and a voltage is, in turn, induced in arm 37 of rotor 35 if arm 37 is not positioned at a null as is well known in the resolver art. If rotor 35 is not at a null the signal will be amplified by amplifier 39 and coupled to winding 40 of motor 41 which motor then rotates rotor 35 toward the null position. As is also well known in the resolver art, there is no 180° ambiguity because the motor always rotates the rotor away from an unstable null.

When switches 19, 22, 38, and 44 are thereafter switched to the drive position (as shown by solid lines in FIGURE 1) wherein amplifiers 31 and 32 are supplied with power and connected to the horizontal coils, and wherein winding 36 of rotor 35 is energized, power is coupled to, rather than from, coils 13 and 15 as well as 14 and 16 through amplifiers 31 and 32, respectively. Since coils 10 and 11 are constantly energized, energization of any of the coils electrically in quadrature causes a rotative force to be established to spin ball 6 about a horizontal spin axis. Therefore, by coupling the power to coils 13, 14, 15 and 16 through resolver 30 it is proportioned between the serially connected pairs of coils depending upon the positioning of rotor 35 during the sensing period and drives the ball about the spin axis regardless of orientation. It is to be realized, of course, that although winding 37 was positioned at a null, power is coupled through the resolver by means of rotor winding 36, which winding is in quadrature with winding 37, so that a maximum signal is coupled through the resolver during the driving period. When using a 400 c.p.s. power source, it has been found, for example, that the velocity of the ball can be made to approach 10,000 revolutions per minute.

Thus, by first positioning rotor 35 with respect to the spin axis of ball 6, the rotative force applied to drive ball 6 will not cause precession of the spin axis. It therefore follows that repeated or constant sensing of the spin axis to position rotor 35 prior to or simultaneously with application of the driving force will operate to slave the driving force to the spin axis and will avoid virtually all undesirable precession of said spin axis due to said driving force.

Sensing of the spin axis and driving the ball about this axis may be done alternately through the use of the switches 19, 22, 38 and 44, as shown in FIGURE 1, or may be done simultaneously by using two power sources of different frequencies, as shown in FIGURE 2.

To sense and drive simultaneously, coils 10 and 11 may be connected in series with a high power frequency source 53 (1000 c.p.s. for example), and a low frequency power source 54 (400 c.p.s. for example), as shown in FIGURE 2.

Since two frequencies are being utilized, separate circuit paths must be established and this may be accomplished through the use of filters. As shown in FIGURE 2, coils 13 and 15 may be connected to amplifier 31 through a high frequency filter 58 tuned to pass the frequency of high frequency power source 53, while coils 14 and 16 may be connected to amplifier 32 through a second high frequency filter 61 identical to the filter 58. Likewise coils 13 and 15 may be connected to stator arm 33 while coils 14 and 16 may be connected to stator arm 34 through low frequency filters 63 and 64, respectively which filters are tuned to pass the frequency of low frequency power source 54.

As shown in FIGURE 2, rotor 35 of resolver 30 may have arm 36 connected to high frequency power source 53, while arm 37 may be connected through amplifier 39 to winding 40 of motor 41 in the same manner as described with respect to FIGURE 1. In addition, low frequency power source 54 may be connected to winding 42 of motor 41, and amplifiers 31, 32 and 39 may be connected to amplifier power supply 46 for constant energization.

The drive and sensing network shown in FIGURE 2 therefore operates to simultaneously drive and also sense the spin axis of ball 6 so that rotative force is constantly applied to the ball and so that any change in the orientation of the spin axis will immediately reposition rotor 35 to slave the applied driving force to the spin axis. Drive is applied from high frequency source 53 to coils 10 and 11 directly and to coils 13 through 16 through rotor arm 36, stator 29, amplifiers 31 and 32, and filters 58 and 61. Sensing, on the other hand, utilizes the low frequency source, which source energizes coils 10 and 11 and winding 42 of motor 41, with the spin axis being sensed by means of coils 13 through 16, filters 63 and 64, stator 29, rotor arm 37, amplifier 39 and motor winding 40.

In either embodiment, an A.-C. signal can be applied to the network to correct for errors and this signal may be applied by means of a conventional error correcting generator means 65 during the sensing period or through the sensing path to position the rotor accordingly.

It should be evident to those skilled in the art that in view of the foregoing the driving and sensing means of this invention provides novel means for electrically sensing the orientation of the spin axis of the rotor of a ball gyroscope and driving the rotor about said axis without causing precession thereof.

What is claimed as my invention is:

1. In a ball gyroscope: a ball constructed of magnetic material, first inductive means comprising at least one coil contiguous to the ball and adapted to be connected to a source of A.-C. power; second inductive means comprising a plurality of coils contiguous to and spaced about said ball, the coils of said second inductive means being substantially in quadrature electrically with the coil of said first inductive means; a resolver the stator of which has a plurality of arms each of which is connected by a connecting means with a different coil of said second inductive means and a rotor a first arm of which is adapted to be connected to said source of A.-C. power and a second arm of which is connected to a servo system including a motor constrained to rotation with said rotor and effecting positioning of said rotor to a null position whereby the spin axis of said ball is sensed by said second inductive means and coupled to said resolver during a sensing period when said first inductive means is energized to effect positioning of said rotor so that rotation is imparted to said ball without causing precession thereafter during a driving period when both said first inductive means and said rotor are energized; said connecting means effecting said driving and sensing periods; said connecting means comprising amplifier means and two-position switching means, said switching means in a first position thereof connecting said amplifying means between said stator and said coils of said second inductive means while connecting said source of A.-C. power to said first resolver arm to drive said ball through said resolver; said switching means in a second position thereof connecting said coils of said second inductive means directly to said stator while connecting said A.-C. power source to said servo system to enable said servo system to drive said rotor to a position dependent upon the spin axis of said ball.

2. The combination of claim 1 further characterized by a time sharing circuit means connected to and effecting alternate positioning of said switching means to said first and second positions thereof.

3. In a ball gyroscope, said ball being constructed of a magnetic material, the combination with the ball of: first inductive means including at least one coil contiguous to the ball and adapted to be connected to first and second sources of A.-C. power of different frequencies; second inductive means comprising a plurality of coils contiguous to and spaced about said ball, the coils of said second inductive means being substantially in quadrature electrically with the coil of said first inductive means; a resolver the stator of which has a plurality of arms and a rotor that is adapted to be connected to said first source of A.-C. power; and means connecting each arm of said stator with a different coil of said second inductive means, said last named means including a first path for passing power from said first power source for driving said ball and a second path for passing power of the frequency of said second power source to said resolver stator windings for sensing the orientation of the spin axis of said ball, and servo positioning means including a servo amplifier connected to said resolver rotor and a servo motor responsive to the output of said servo amplifier to position said resolver rotor for a null input to said servo amplifier of signal component having a frequency of said second power source, said rotor thereby assuming a position dependent upon said spin axis orientation whereby rotation may be imparted to said ball without causing precession of the spin axis of said ball.

4. In a ball gyroscope, said ball being constructed of magnetic material the combination with the ball of: first, second, third, fourth, fifth and sixth coils contiguous to and spaced about the ball, said coils being substantially in quadrature electrically with all adjacent coils and said first, second and third coils being positioned substantially diametrically opposite said fourth, fifth and sixth coils respectively; means adapting said first and fourth coils to be connected in series with an A.-C. power source; first and second matched linear amplifiers; a resolver the stator of which has first and second arms in quadrature electrically with one another and the rotor of which has third and fourth arms in quadrature electrically with one another; an electric motor constrained to rotation with said rotor and having one winding electrically connected to the third arm of said rotor and the other winding adapted to be connected with said A.-C. power source; means adapting the fourth arm of said resolver for connection to said source of A.-C. power; and switching means for serially connecting said second and fifth coils and said first stator arm and serially connecting said third and sixth coils and said second stator arm when said switching means is in a first position whereby the orientation of the spin axis of said ball is sensed by said resolver and the third arm of said rotor is caused to be positioned at a null by said motor, said switching means connecting said first and second amplifiers serially with said coils and said stator arms when in a second position whereby when the fourth arm of said rotor is energized amplified power from said A.-C. source causes said ball to rotate along its spin axis without causing precession of the same.

5. The combination of claim 4 further characterized by indicating means connected with said rotor and said motor to partake of rotation thereof and thereby indicate the orientation of the spin axis of said ball.

6. In a ball gyroscope, the combination of: a ball being constructed of magnetic material, first, second, third, fourth, fifth and sixth coils contiguous to and spaced about the ball, said coils being substantially in quadrature with all adjacent coils and said first, second and third coils being positioned substantially diametrically opposite said fourth, fifth and sixth coils, respectively; means adapting said first and fourth coils to be connected in series with high frequency and low frequency sources of power; a resolver having a stator with first and second arms and a rotor with third and fourth arms in quadrature relationship with one another; means adapting said third arm to be connected with said high frequency source of power; a pair of matched linear amplifiers; first and second high frequency filters tuned to pass the frequency of said high frequency source; first and second low frequency filters tuned to pass the frequency of said low frequency source; a motor having one winding electrically connected with said third arm and the other winding adapted to be connected to said low frequency power source so that said motor is caused to be energized when low frequency voltages are induced in said third arm, said motor also being mechanically connected to said rotor so that said rotor is constrained to rotation therewith; means connecting said first arm of said stator with said second and fifth coils through said first high frequency filter and said first amplifier and connecting said second arm of said stator with said third and sixth coils through said second high frequency filter and said second amplifier whereby said high frequency power drives said ball; and means connecting said first arm of said stator with said second and fifth coils through said first low frequency filter and connecting said second arm of said stator with said third and sixth coils through said second low frequency filter whereby the position of said spin axis may be constantly sensed by power from said low frequency source and voltages induced in said third arm so that said rotor is positioned at a null to preclude precession of the spin axis of said ball due to said high frequency applied driving force.

7. The combination of claim 6 further characterized by indicating means connected to said rotor and said motor to indicate the orientation of the spin axis of said ball.

References Cited by the Examiner

UNITED STATES PATENTS

| | | | |
|---|---|---|---|
| 1,972,882 | 9/34 | Gillmor | 74—5.6 X |
| 2,562,690 | 7/51 | Becker | 74—5.6 X |
| 2,691,306 | 10/54 | Beams et al. | 74—5.7 X |
| 2,879,668 | 3/59 | Mleczko | 74—5.4 |
| 2,942,479 | 6/60 | Hollmann | 74—5 |
| 2,960,873 | 11/60 | Lundberg | 74—5.7 X |
| 3,017,777 | 1/62 | Haeussermann | 74—5 |

BROUGHTON G. DURHAM, *Primary Examiner.*

DON A. WAITE, *Examiner.*